(12) United States Patent
Beck et al.

(10) Patent No.: US 7,441,701 B2
(45) Date of Patent: Oct. 28, 2008

(54) UNIVERSAL CARD READER APPARATUS AND METHOD

(75) Inventors: David Beck, Exeter, RI (US); Gregory Klein, Newport, RI (US)

(73) Assignee: ZIH Corp., Hamilton (BM)

( * ) Notice: Subject to any disclaimer, the term of this patent is extended or adjusted under 35 U.S.C. 154(b) by 58 days.

(21) Appl. No.: 10/901,718

(22) Filed: Jul. 29, 2004

(65) Prior Publication Data
US 2006/0022039 A1 Feb. 2, 2006

(51) Int. Cl.
G06K 7/00 (2006.01)
H05K 1/14 (2006.01)

(52) U.S. Cl. .................. 235/440; 235/486; 361/737

(58) Field of Classification Search .................. 235/454, 235/486, 472, 475, 382, 382.5, 380, 385, 235/449, 379; 361/737, 784, 785
See application file for complete search history.

(56) References Cited

U.S. PATENT DOCUMENTS

| | | | |
|---|---|---|---|
| 2,250,025 A | 7/1941 | Klein | |
| 3,971,280 A | 7/1976 | Inka | |
| 4,105,168 A | 8/1978 | Rutherford | |
| 4,248,391 A | 2/1981 | Ness | |
| 4,913,367 A | 4/1990 | Hata | |
| 4,948,064 A | 8/1990 | Richard | |
| 5,025,998 A | 6/1991 | Hutzenlaub et al. | |
| 5,180,905 A | 1/1993 | Chen et al. | |
| 5,472,153 A | 12/1995 | Crowley et al. | |
| 5,486,259 A | 1/1996 | Goodwin et al. | |
| 5,763,862 A * | 6/1998 | Jachimowicz et al. | ....... 235/380 |
| 5,783,809 A | 7/1998 | Niino et al. | |
| 5,788,384 A | 8/1998 | Goodwin et al. | |
| 5,813,343 A | 9/1998 | Harb | |
| 5,833,377 A | 11/1998 | Keller et al. | |
| 5,833,800 A | 11/1998 | Goodwin et al. | |

(Continued)

FOREIGN PATENT DOCUMENTS

EP 0 549 568 A2 4/1987

(Continued)

OTHER PUBLICATIONS

United Kingdom Search Report dated Dec. 8, 2005 for Application No. GB0515340.8 (Filed Jul. 26, 2005).

*Primary Examiner*—Le Thien Minh
*Assistant Examiner*—Thien T Mai
(74) *Attorney, Agent, or Firm*—Alston & Bird LLP

(57) ABSTRACT

A multiple card reading apparatus for reading at least two different types of information cards that may be used in a handheld point of sale device with printing capability. The multiple card reading apparatus has a housing containing at least two card reading devices and defining slots that receive the cards and position them for reading by the card reading devices. In one aspect, the slots overlap facilitating a compact arrangement of the card reading apparatus. Preferably, the common portions of the slots are an entrance portion so that only a single slot marks the outside of the housing. For instance, the slots may originate in the same position but diverge at different angles from each other. In this manner, different types of cards can be inserted through the same opening portion but at different angles to reach different card reading devices capable of reading its respective type of card.

21 Claims, 10 Drawing Sheets

U.S. PATENT DOCUMENTS

| | | | |
|---|---|---|---|
| 6,010,066 A * | 1/2000 | Itou et al. | 235/379 |
| 6,062,887 A | 5/2000 | Schuster et al. | |
| 6,065,679 A | 5/2000 | Levie et al. | |
| 6,097,605 A * | 8/2000 | Klatt et al. | 361/737 |
| 6,158,342 A | 12/2000 | Moore | |
| 6,164,203 A | 12/2000 | Keller | |
| 6,202,055 B1 * | 3/2001 | Houvener et al. | 705/44 |
| 6,234,396 B1 * | 5/2001 | Tawara | 235/472.01 |
| 6,302,604 B1 | 10/2001 | Bryant et al. | |
| 6,431,492 B1 | 8/2002 | Chillscyzn | |
| 6,503,008 B2 | 1/2003 | Zevin et al. | |
| 6,564,998 B1 * | 5/2003 | Oross et al. | 235/382 |
| 6,607,316 B1 | 8/2003 | Petteruti et al. | |
| 6,609,844 B1 | 8/2003 | Petteruti et al. | |
| 6,622,622 B2 | 9/2003 | Lee et al. | |
| 6,663,007 B1 | 12/2003 | Sun et al. | |
| 6,695,500 B2 | 2/2004 | Kim et al. | |
| 6,712,112 B2 | 3/2004 | Goodwin et al. | |
| 6,796,234 B1 | 9/2004 | Busshoff | |
| 6,805,183 B2 | 10/2004 | Goodwin et al. | |
| 6,814,294 B2 * | 11/2004 | Liston et al. | 235/472.01 |
| 6,922,527 B2 * | 7/2005 | Igarashi | 396/147 |
| 7,075,793 B2 * | 7/2006 | Le et al. | 361/737 |
| 2002/0077974 A1 | 6/2002 | Ortiz | |
| 2002/0168900 A1 | 11/2002 | Chen | |
| 2003/0043353 A1 * | 3/2003 | Oka et al. | 355/40 |
| 2004/0026506 A1 | 2/2004 | Finkelstein | |
| 2005/0120165 A1 * | 6/2005 | Liang | 711/103 |

FOREIGN PATENT DOCUMENTS

| | | |
|---|---|---|
| EP | 1 365 562 A1 | 11/2003 |
| JP | 5046635 | 2/1993 |

* cited by examiner

UNIVERSAL CARD READER APPARATUS AND METHOD

BACKGROUND OF THE INVENTION

1. Field of the Invention

The present invention is directed to devices and methods for reading information from information bearing cards, and more particularly to devices and methods for the reading of different types of information bearing cards.

2. Description of Related Art

Information cards have become increasingly important in recent times due to the increase in cashless transactions and the need for greater corporate, home and governmental security. Information cards are typically some type of plastic card that contains and conveys information in the form of indicia, or as encoded information. For instance, information cards include magnetic stripe cards, such as credit cards and banking cards, that can be "swiped" past a reader to convey the information encoded in the magnetic stripe. Barcode cards bear barcode indicia that can be scanned by a laser scanner, or other scanning device, to convert the visual indicia of the barcode into digital information. In addition to barcodes, cards may include other indicia such as fluorescent text, holograms, or encode pixilated images that can be read with appropriate readers. Smart cards include cards having some type of electronic component, such as a radio frequency identification (RFID) tag that responds to a radio emission with its own emission of information stored in memory. Other types of smart card are also used, such as cards having circuitry and contacts (e.g., gold plated contacts) which are contacted by the smart card reader for reading.

One use of these cards is in cashless transactions, such as at a restaurant. After completion of dining, a waitperson brings a bill to the table. Upon noticing the bill, the customer either pays in cash or provides a credit or bank card. The waitperson must retrieve the credit or bank card and return to a point-of-sale terminal to swipe the card (if it is a magnetic stripe card). Once the transaction is approved at the point-of-sale terminal, a receipt is printed out bearing the transaction amount and a signature line. The waitperson then returns to the table and drops off the card and receipt for signing by the customer. The customer signs the receipt to acknowledge payment and is then free to depart. As is evident from the description, the process of conducting a credit card transaction is relatively time consuming when compared to a cash transaction.

Wireless point of sale terminals have been developed in an effort to mediate the delays of paying by credit or bank card. For example, U.S. Patent Application Publication No. 20020077974 to Ortiz ("Ortiz") discloses a hand held device 56 that includes a touch screen display 52 and that is configured to read a card 50 and transmit transaction information over a wireless network 70 to a printing station 72, as shown in FIG. 4 of Ortiz. During use the credit card is inserted into the hand held device which reads data from the credit card and transmits this data wirelessly through a local server to a clearinghouse server. If the clearinghouse server approves the transaction, the hand held device wirelessly transmits details to the printer for printing of a receipt. The touch screen display may also be configured to record a signature of the cardholder. Notably, the hand held device disclosed by Ortiz eliminates the need to return with the card to a point of sale terminal. However, the printing station may also be at an inconvenient location for the waitperson and require additional trips. Further, with the advent of different types of transaction cards, such as smart and RFID the problem may still arise that the hand held device will only be able to recognize one type of card.

U.S. Pat. No. 6,065,679 to Levie ("Levie") discloses a modular transaction terminal that includes a communications module 100 defining a longitudinal slot 96 for receiving and reading a magnetic strip card and transverse slot 98 for receiving and reading smart cards, as shown in FIG. 4 of Levie. In addition, the communications module may be connected to a printer 108, as shown in FIG. 7 of Levie. Despite being able to read two different types of information or transaction cards, the entire assembled unit shown by Levie is rather large and cumbersome for comfortable handheld use.

It would be advantageous, therefore, to have a hand held point-of-sale transaction device that not only allows for mobile point of sale activities, but also printed receipts resulting from those activities. In addition, it would be advantageous to have a mobile point of sale device that is capable of reading different types of information cards without being large or cumbersome.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
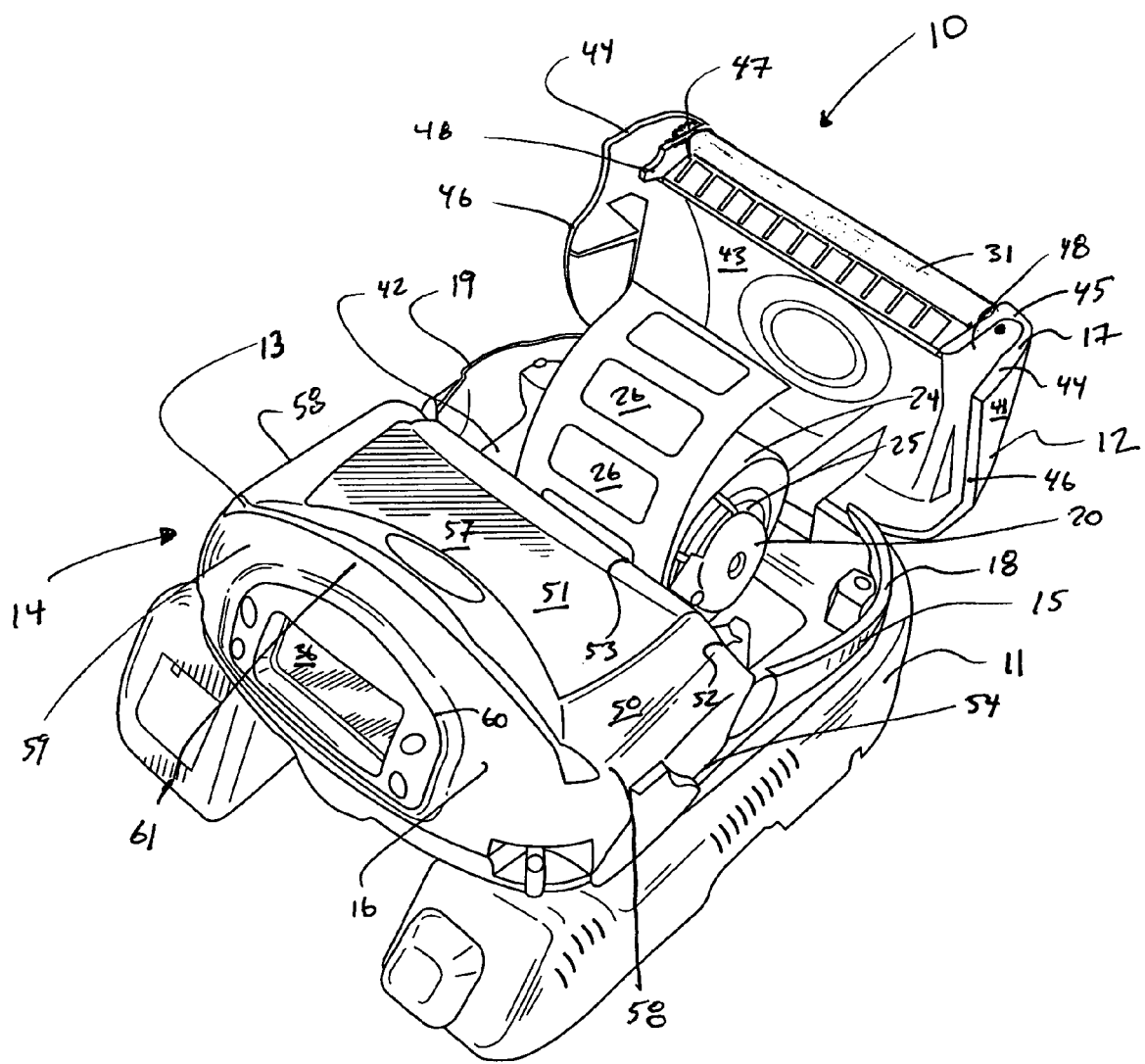
FIG. 1 is a perspective view of a handheld printer positioned in a cradle of one embodiment of the present invention.

The present invention meets the above needs and achieves other advantages by providing a multiple card reading apparatus for reading at least two different types of information cards. The multiple card reading apparatus has a housing containing at least two card reading devices and defining slots that receive the cards and position them for reading by the card reading devices. Advantageously, the slots overlap facilitating a compact arrangement of the card reading apparatus. Preferably, the common portions of the slots overlap in an entrance portion so that only a single slot is generally visible from the outside of the housing. For instance, the slots may originate in the same position but diverge at different angles from each other. In this manner, different types of cards can be inserted through the same opening portion but at different angles to reach different card reading devices capable of reading its respective type of card. Preferably, this multiple card reading apparatus is employed with a handheld device, such as a handheld printer and point of sale terminal.

In one embodiment, the present invention includes a multiple card reading apparatus for reading at least two different types of information containing cards, including a first and second types of cards. A first card reading device of the multiple card reading apparatus is configured to read information from the first type of card. A second card reading device is configured to read information from the second type of card. A housing of the multiple card reading apparatus defining a first card slot is configured to receive and guide the first type of card into a position at which the first card is readable by the first card reading device. The housing further defines a second card slot configured to receive and guide the second type of card into a position at which the second card is readable by the second card reading device, wherein the first and second slots have at least one common portion.

Preferably, the common portion is an entrance portion so as to reduce the visual impact of the slots. For receiving standard flat, rectangular transaction cards the first and second slot preferably have generally linear shapes and extend from the entrance portion at different angles with respect to each other. For example the angles may range between about 10° to 45°, or more preferably, the angle between the slots is about 30°.

In another aspect, the first card slot extends through lateral edges of the housing so as to allow swiping of the first card past the first card reading device. The second card slot may be contained within the lateral edges of the housing and is configured for insertion and temporary retention of the second card.

The card reading devices may be capable of reading different types of cards, such as smart cards, magnetic strip cards or cards carrying indicia such as barcodes or other encoded indicia. Relatively smaller card readers are preferably positioned closer to an exterior surface of the housing than relatively large card readers to conserve space.

In another aspect, the multiple card reading apparatus may also include a wireless communication device for transmitting data read from the cards. For instance, data read from a transaction-type card by the first or second card reading device can be used to obtain clearance for the transaction. Further, the multiple card reading apparatus may be configured to communicate with a printer so as to print a receipt from the transaction.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

A handheld point of sale and printer device 10 positioned in a cradle 11 and including a housing 12 defining a card receiving opening 13 of a multiple card reading apparatus 14 of the present invention is shown in FIG. 1. Generally, the multiple card reading apparatus is capable of accepting different types of cards by a compact configuration of its components facilitated by overlapping portions of guide slots defined in the housing 12, as described below.

Various aspects of the printer illustrated in FIG. 1 are described in greater detail in the following patent applications which have been filed concurrently herewith and are hereby incorporated herein in their entirety by reference, including:

U.S. Provisional Application No. 60/592,490 to Horrocks, et al., filed on Jul. 29, 2004 and entitled SYSTEM AND METHOD FOR PROVIDING A PORTABLE PRINTER CAPABLE OF ALTERING THE ORIENTATION OF INFORMATION DISPLAYED ON AN ASSOCIATED PRINTER DISPLAY;

U.S. Provisional Application No. 60/592,110 to Klein, et al., filed on Jul. 29, 2004 and entitled INTERCHANGEABLE MODULE FOR A PORTABLE PRINTER AND SYSTEM FOR OPERATING THE SAME;

U.S. Nonprovisional application Ser. No. 10/901,883 to Lyman, et al., filed on Jul. 29, 2004 and entitled PRINTER ASSEMBLY AND METHOD OF USING THE SAME;

U.S. Nonprovisional application Ser. No. 10/901,637 to Lyman, et al., filed on Jul. 29, 2004 and entitled DOCKING STATION AND ASSOCIATED METHOD FOR DOCKING A PORTABLE PRINTER; and U.S. Nonprovisional application Ser. No. 10/901,686 to Beck, et al., filed on Jul. 29, 2004 and entitled PRINTER CABLE AND ASSOCIATED STRAIN RELIEF COLLAR FOR CREATING A RUGGEDIZED CONNECTION FOR AN ELECTRICAL TERMINAL OF A PRINTER AND ASSOCIATED METHODS THEREFOR.

Although the multiple card reading apparatus 14 is shown employed in the handheld printer 10, the multiple card reading apparatus could be used in a range of devices, including automated teller machines, security door locks and any device that employs information cards, and in particular might benefit from being able to accept different types of information cards. It should be noted, however, that the compact configuration of the multiple card reading apparatus 14 of the present invention is particularly advantageous when employed in devices that are of limited size, such as handheld devices. Also notable, is that the printer device 10 illustrated herein need not be a point of sale device, but instead could be a printer of documents requiring insertion and reading of security cards by the multiple card reading apparatus 14.

Different types of information cards could be received and read by the multiple card reading apparatus. For instance, magnetic strip cards could be used which are rectangular cards having a magnetic strip on one side that is in a standardized offset position from one edge. The magnetic strip is typically encoded with some type of information, such as identification information of the user or a credit or bank card account number. Smart cards could also be received and read wherein the smart card includes an embedded electronic device containing encoded data. The embedded electronic device may include a memory device that can be read through a contact or contacts or, in the case of an embedded RFID tag, as a result of a non-contact transmission of radio frequency energy which is responded to by the tag. Other types of card include cards capable of conveying information through various indicia, such as encoded characters, barcodes, encoded images, holograms, fluorescent indicia, etc., that can be recognized by an appropriate reader.

Generally, therefore, the multiple card reading apparatus 14 of the present invention can be employed to read any two (or more) different types of information cards regardless of what those types are and how the cards hold and convey information, and still fall within the scope of the present invention. Notably, the present invention could also be adapted to read types of information cards that will be developed in the future and should not be limited to presently known types of information cards.

It is noted here that the term "card" is used to denote the media unit carrying the magnetic strip, RFID, barcode, etc. It must be understood that systems and methods of the present invention can be used with any type of media capable of bearing such information, such as documents, film, etc. The present invention is not limited to cards per se.

Figure 3:
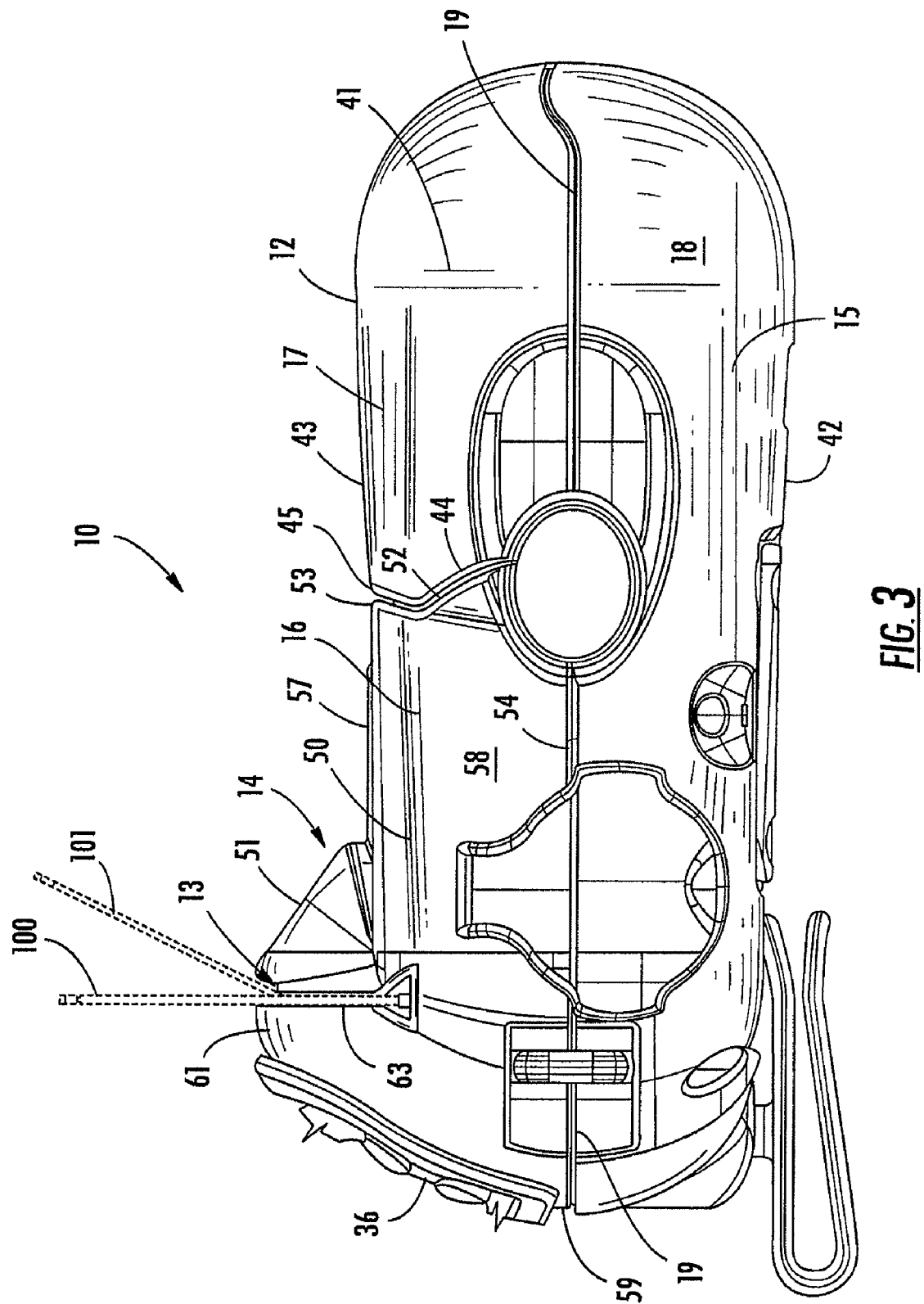
FIG. 3 is a side elevation view of the handheld printer shown in FIG. 1.
Figure 9:
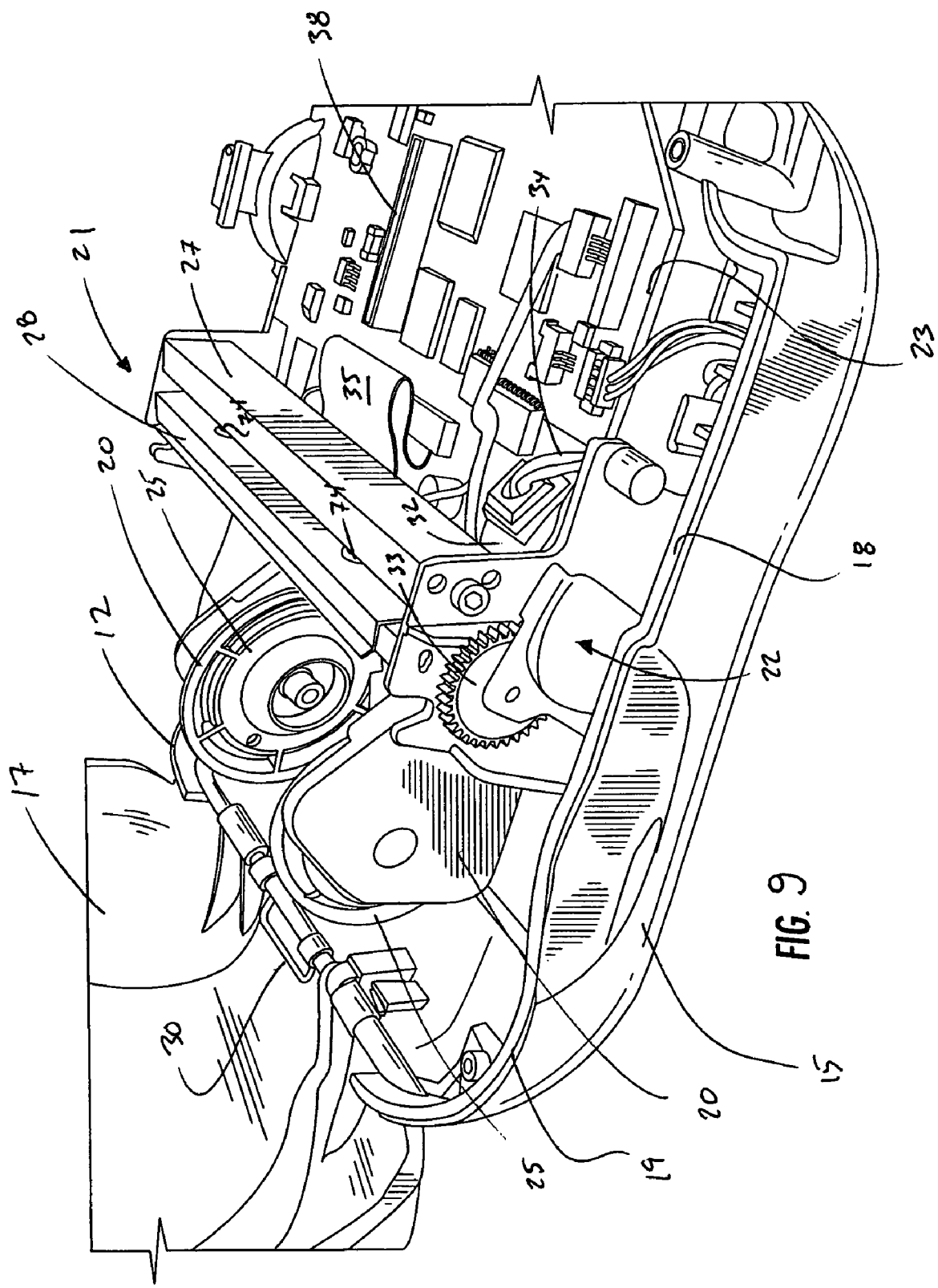
FIG. 9 is a perspective view of printer assembly of the printer of FIG. 1.

In the illustrated embodiment, the entire housing 12 of the printer device 10 has a rounded rectangular shape and includes a base 15, a communications and card reader module housing portion 16 and a lid 17, as shown in FIGS. 1 and 3. The base 15, the card reader module housing portion 16 and the lid 17 are each subsections of the housing 12. The housing 12 may also include frame portions that are secured to other portions, such as the base 15. The base 15 has a rectangular shape with a wall structure 18 extending upwards from a bottom surface 42 to support and contain various electronic and mechanical assemblies of the printer device 10, as shown in FIG. 9. The wall structure 18 ends in a free edge 19 that extends continuously around the rectangular shape of the wall structure and is configured to mate with the module housing portion 16 and lid 17 of the housing 12.

Supported by and partially contained within the base 15 of the housing 12 are a pair of media supports 20, a print head assembly 21, a drive assembly 22 and a main circuit board 23, as shown in FIG. 9. The media supports 20 include a pair of media disks 25 that are circular in shape to match and grip the ends of a media roll 24 while still allowing rotation of the media roll. The media roll contains a wound strip of printer media, such as continuous strip of paper or labels 26. Attached to the base 15 and supporting the media supports 20 is a media guide plate, an edge of which can be seen in FIG. 9.

The print head assembly 21 includes an elongate, rectangular mounting plate 27 that is fixedly attached at its ends to a frame portion of the base 15, as shown in FIG. 9. An elongate print head 28 is attached to the mounting plate 27 via a pair of springs 74. The print head 28 makes contact with the strip of media 26 and prints on the strip of media using a burn line (not shown). The springs allow the print head 28 to reciprocate somewhat to maintain contact with the strip of media which is sandwiched between the print head and a platen bar 31 which is supported by the lid 17, as will be described in greater detail below. The drive assembly 22 includes a motor 32 that drives gears 33 which rotate the platen bar 31 to advance the media strip 26 during printing. The motor 32 is connected to the main circuit board 23 by communication and/or power lines 34.

The main circuit board 23 includes a processor and other electronic components for controlling printer operation which are not described in greater detail herein for the sake of brevity. The main circuit board 23 is connected to the motor 32, as mentioned above, and is also connected to the print head 28 through ribbon cables 35 and is connected to a display pad 36 via ribbon cables 37A and 37B. The display pad includes a screen connected to ribbon cable 37A and a keypad connected to ribbon cable 37B. The main circuit board 23 also includes a multiple pin connector slot 38 that is configured to mate with a multiple pin male connector 39 of a communications and card reader circuit board 40 supported in the module housing portion 16 of the housing 12.

The lid 17 is attached to an end edge of the base 15 via a hinge connection that is biased by a torsion spring 30 into the open position shown in FIG. 1. Generally, the lid has its own wall structure 41 extending from a top 43, although the wall structure of the lid does not extend continuously around the entire top. As a result, side edges 44 of the wall structure 41 and edge portions 45 of the top 43 are configured to engage similar edges on the module housing portion 16. Also, a downwardly directed edge 46 (with respect to its orientation in FIG. 3) of the wall structure 41 is configured to engage the upwardly directed edge 19 of the wall structure 18 of the base 15 when the lid 17 is rotated about its hinge into a closed position. The top 43 of the lid 17 forms a relatively flat, planar deck which extends generally parallel to the bottom surface 42 of the base 15. The deck may be constructed of translucent or transparent material to facilitate observation of the amount of media left for printing.

Supported by the lid 17 is a platen assembly that includes the platen bar 31 and a platen gear 47. In particular, the platen bar 31 has a shaft that is rotatably mounted within holes defined in a pair of mounting flanges 48 which are part of single frame of the housing 12 and extend downwards from the top 43 of the lid 17, adjacent the edge portions 45, as shown in FIG. 1. The platen gear 47 is mounted to the shaft of the platen bar outside of its adjacent one of the mounting flanges 48 so as to be drivably meshed with the drive gears 33 when the lid is in the closed position.

Figure 10:
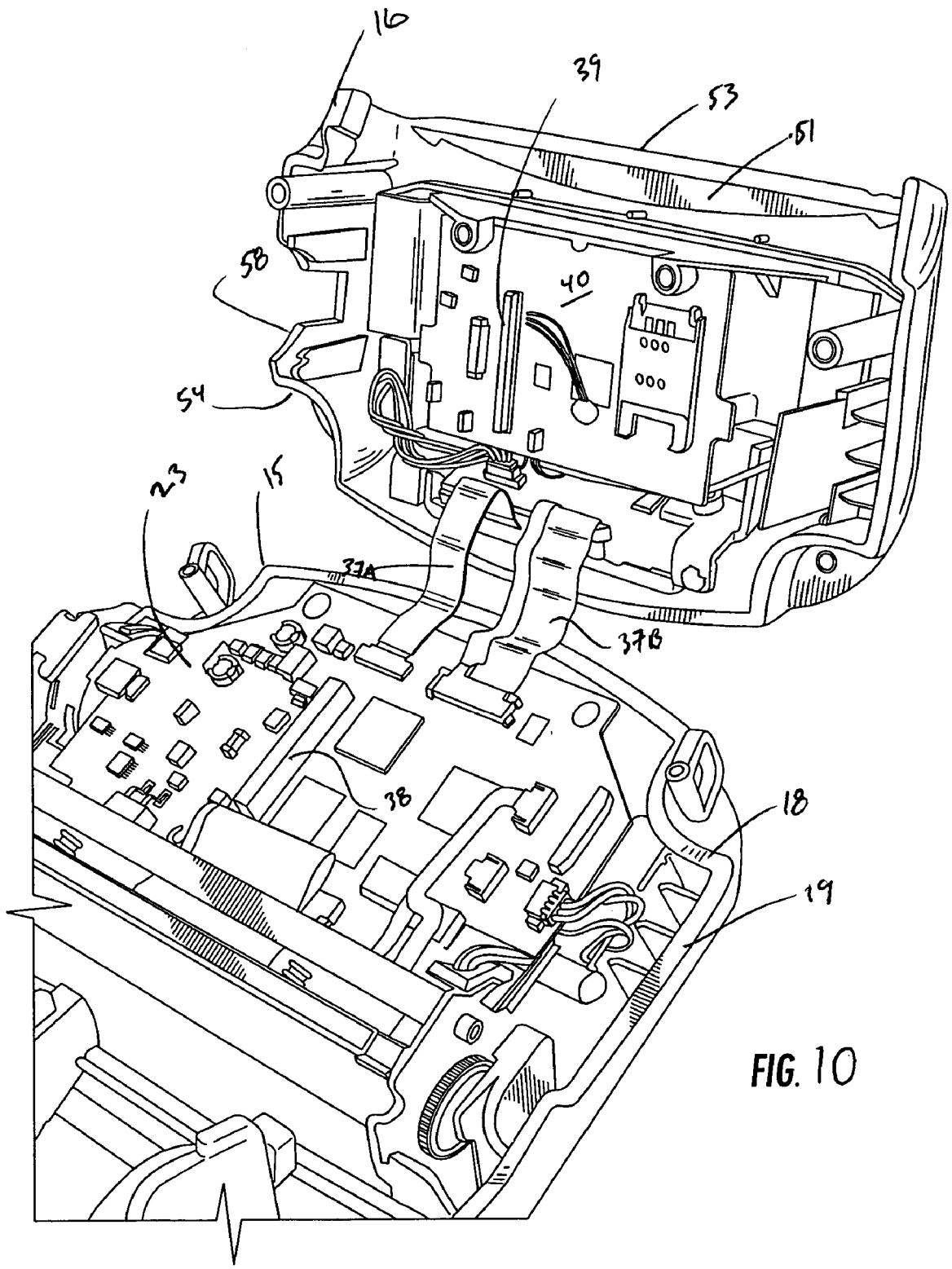
FIG. 10 is a perspective view of a communications and card reader module housing (and its contents) of the printer of FIG. 1.

Generally, the multiple card reading apparatus 14 in the illustrated embodiment includes the module housing portion 16 and its associated card reading components, as described below. Referring to FIG. 10, the module housing portion 16 includes its own wall structure 50 that extends downward (with respect to its orientation in FIG. 3) from a top 51 of the module housing portion. In particular, the wall structure 50 includes two side surfaces 58 that extend downward from opposite sides of the top 51 in a generally parallel arrangement, as shown in FIG. 1. The wall structure 50 also includes an end surface 59 that extends between the side surfaces 58 and defines a display unit opening 60 sized and shaped to hold and allow viewing and interaction with the display pad 36.

Similar to the wall structure 41 of the lid 17, the wall structure 50 of the module housing portion 16 does not extend continuously around its entire top 51. Side edges 52 of the wall structure 50 and an edge portion 53 of the top 51 are configured to engage the side edges 44 and the edge portions 45 of the lid 17 when the lid is in the closed position, as shown in FIG. 3. A downwardly directed edge 54 of the wall structure 50 similarly engages the upwardly directed edge 19 of the wall structure 18 of the base 15 so as to form a complete enclosure when the lid 17 is in the closed position.

The top of the module housing portion 16 includes a relatively planar deck 57 that abuts the top 43 of the lid 17 (when the lid is closed) to form a continuous deck, as shown in FIG. 3. This deck defines an opening through which extends the labels 26 as they are dispensed past the print head assembly 21 and over the platen bar 31. The top 51 of the module housing portion 16 also includes a card receiving portion 61 that extends upwards at an angle to the deck 57 and then downwards to transition into the end surface 59, as shown in FIG. 3.

Figure 2:
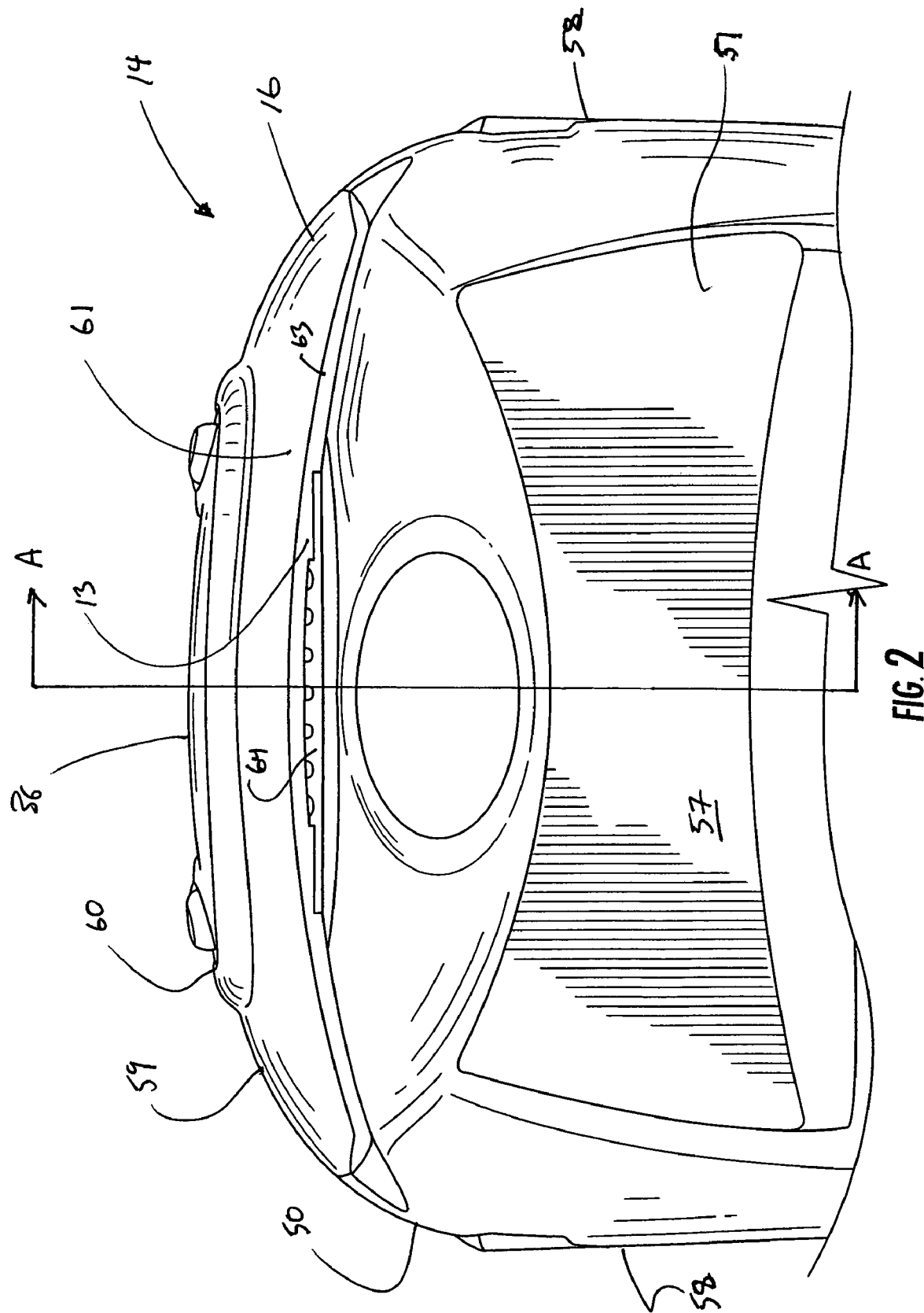
FIG. 2 is a partial plan view of a multiple card reading apparatus as a portion of the handheld printer shown in FIG. 1.

Defined at a peak of the card receiving portion 61 of the housing 12 is the card receiving opening 13, as shown in FIGS. 1 and 2. The card receiving opening 13 extends along a width of the housing 12, between and through the side surfaces 59 of the wall structure 50. Extending downwardly at approximately a vertical orientation (with respect to the orientation of FIG. 3) from the card receiving opening 13 is a magnetic strip card slot 63 defined in the module housing portion 16, as shown in FIGS. 4-6 and 8. The magnetic strip card slot 63 is sized and shaped to allow swiping of a magnetic strip card 100 across a width of the housing 12.

Also extending downwardly from the card receiving opening 13, but at about a 30° angle with respect to the magnetic strip card slot 63, is a smart card slot 64, as shown in FIGS. 4-6 and 8. The smart card slot is about the width and thickness of a smart card 101 and is positioned to extend from about a center portion of the card receiving opening 13, as shown in FIG. 3. This configuration allows the smart card 101 to be inserted through the card receiving opening 13 and retained in the smart card slot 64 during reading.

Figure 4:
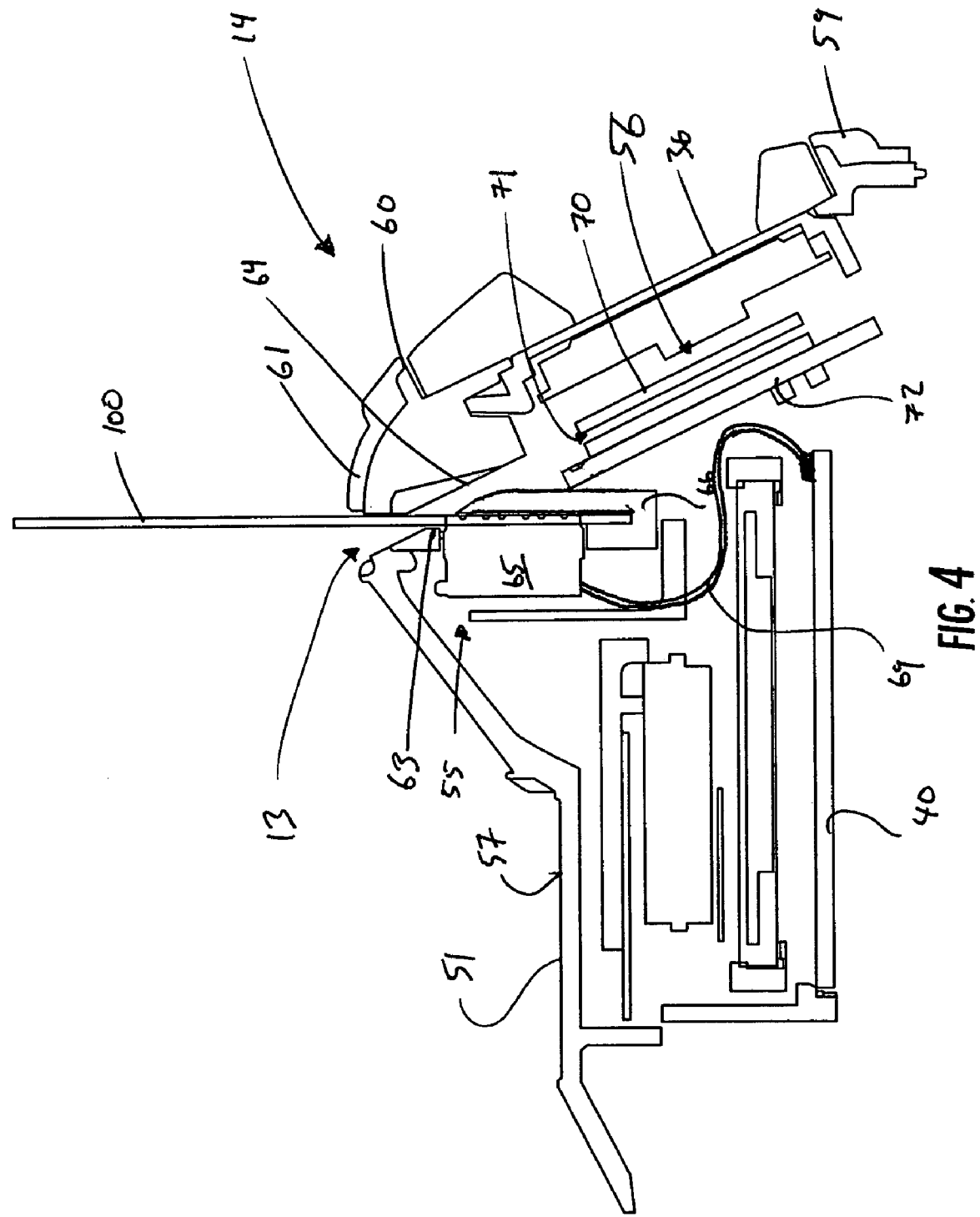
FIG. 4 is a cross-sectional view taken along line A-A in FIG. 2 of the multiple card reading apparatus of FIG. 2 reading a magnetic strip card.

Supported by the module housing portion 16 is the communications and card reader circuit board 40 which is in a generally parallel orientation with respect to the top 51 of the module housing portion 16, as shown in FIGS. 4 and 10. Positioned on the outer surface of the communications and card reader circuit board 40 is the male connector 39 which, as described above, is configured to engage the female multiple pin connector slot 38 on the main circuit board 23. Generally, in one aspect the circuit board 40 is configured to perform communications tasks and includes, for example, one or more of a Wi-Fi 802.11 wireless interface, a Bluetooth wireless radio and a cellular network connection to promote wireless, handheld use.

The circuit board 40 is further configured to interface with smartcard, magnetic card, barcode scanning and other information card reading devices and to process and route information therefrom to the main circuit board 23. With respect to the illustrated embodiment of the card reading apparatus 14, two card reader devices are housed in the module housing portion 16, including a magnetic card reader 55 and a smart card reader 56.

Figure 5:
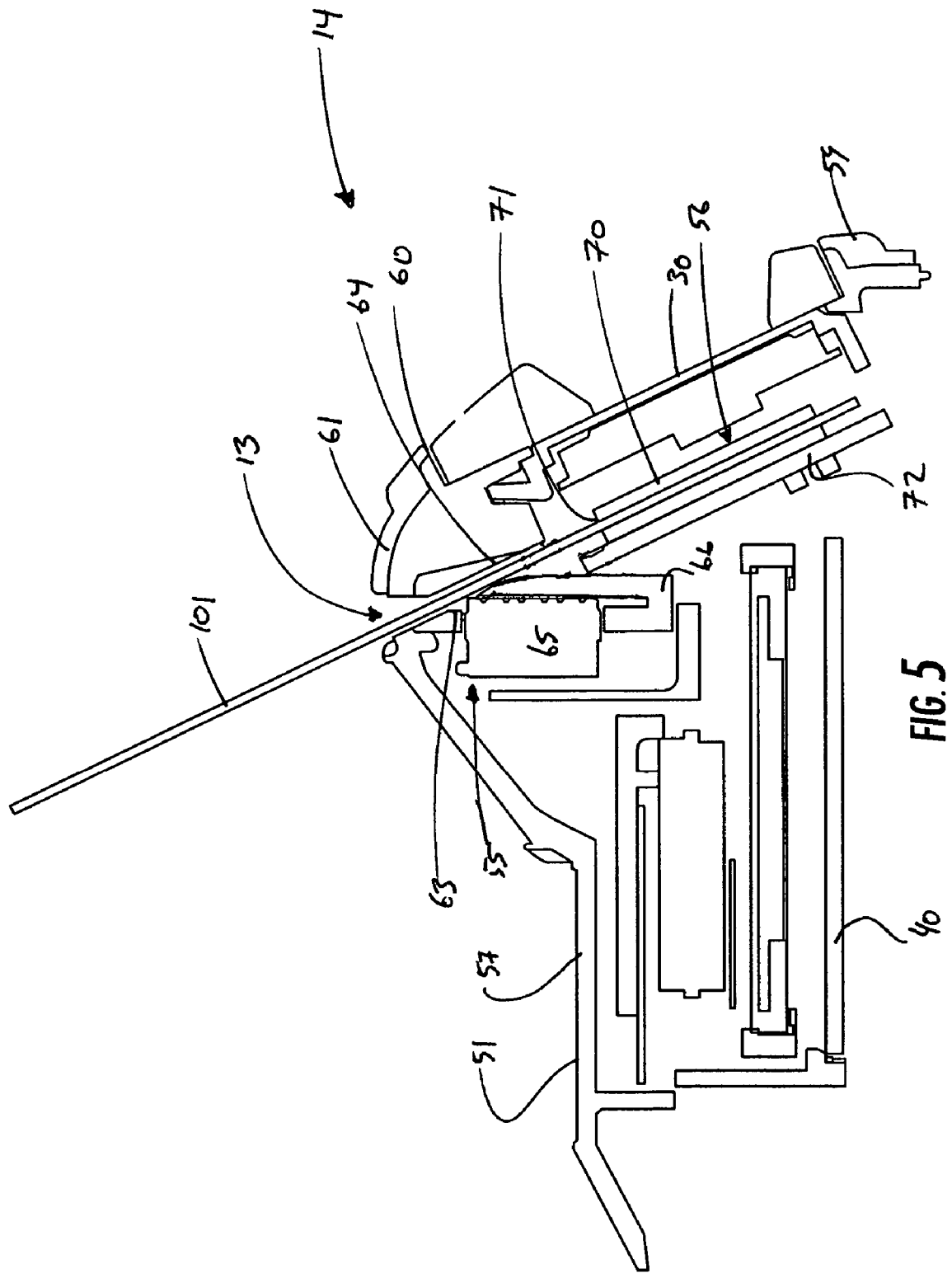
FIG. 5 is a cross-sectional view taken along line A-A in FIG. 2 of the multiple card reading apparatus of FIG. 2 reading a smart or RF card.
Figure 6:
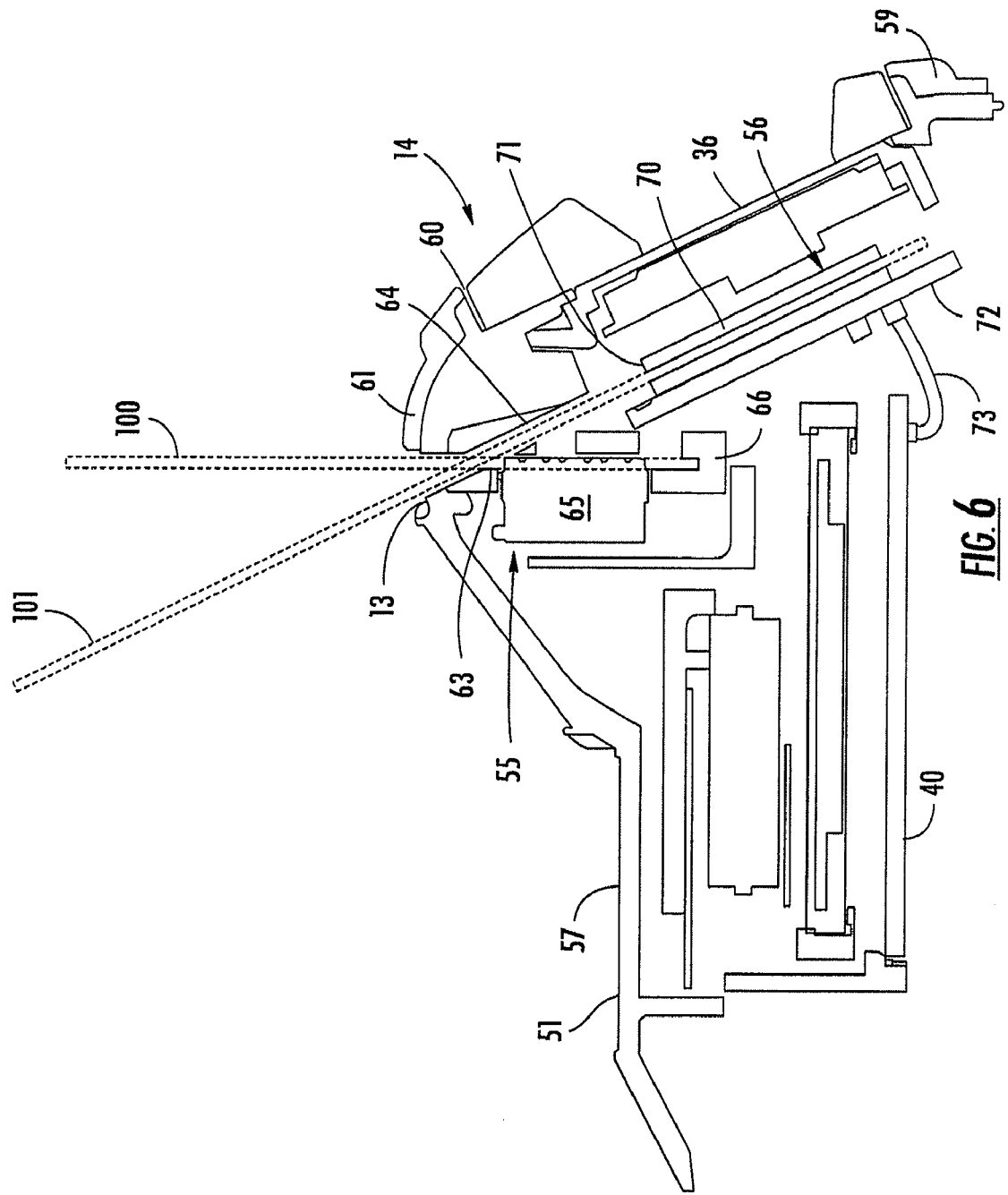
FIG. 6 is a cross-sectional view taken along line A-A in FIG. 2 of the multiple card reading apparatus of FIG. 2 showing overlapping positions of the magnetic strip and smart cards.
Figure 7:
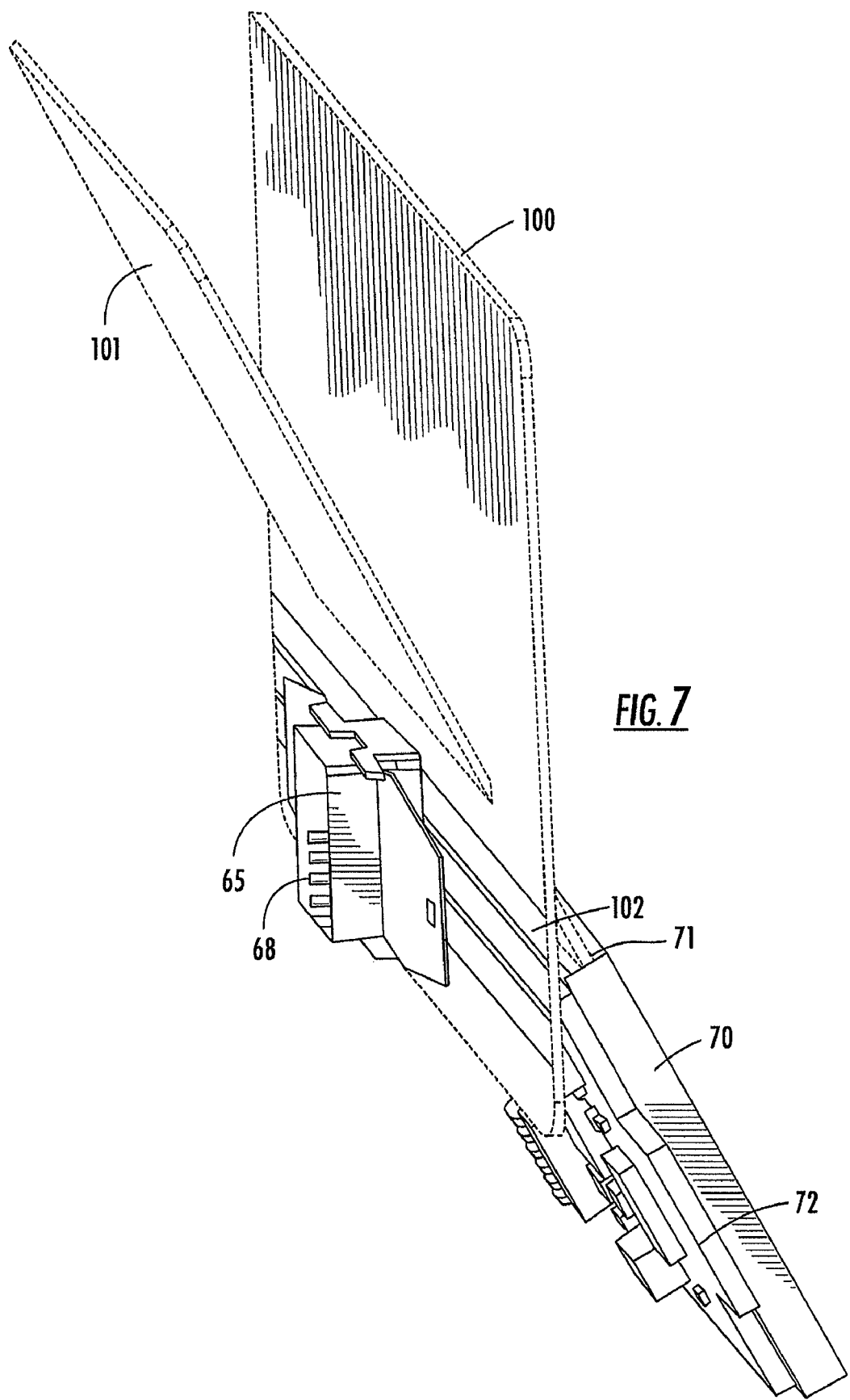
FIG. 7 is a schematic of a magnetic strip reader and a smart card reader of the multiple card reading apparatus of FIG. 2.
Figure 8:
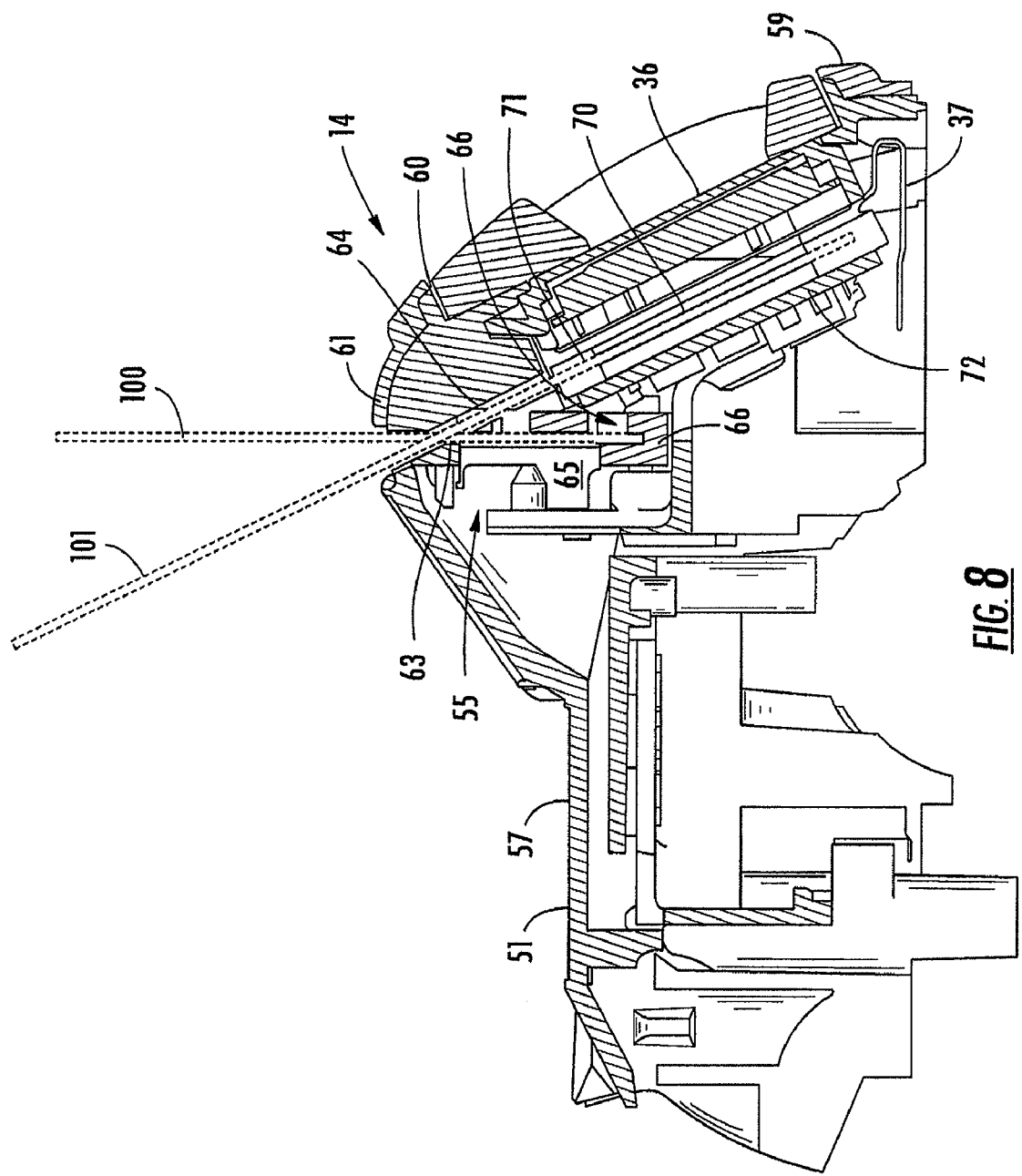
FIG. 8 is a cross-sectional view of the multiple card reading apparatus of FIG. 2.

The magnetic card reader 55 includes a magnetic strip reading head 65 and a guide channel 66 (which can be considered a part of the module housing portion 16), as shown in FIG. 4. The magnetic strip reading head 65 is supported by a portion of the module housing portion 16 in a position above the guide channel 66 and is biased so as to extend into the magnetic strip card slot 63 when the magnetic strip card 100 is not present therein, as shown in FIG. 5. In addition, the positioning of the magnetic strip reading head 65 above the guide channel 66 corresponds to the offset position of one or more magnetic strips 102 extending the length of the magnetic strip card 100, as shown in FIG. 7.

Positioned opposite the magnetic strip reading head 65 is the guide channel 66 (which can be considered part of the module housing portion 16) against which the front of the magnetic strip card 100 is urged when swiped through the magnetic strip card slot 63. The guide channel 66 defines a "gutter" shape that is sized to receive a bottom edge of the magnetic strip card 100 during its swipe past the magnetic strip reading head 65. Information read by the magnetic strip reading head 65 is communicated to the card reader circuit board 40 via a pig tail cable 69 attached to several pins 68 extending from the rear of the magnetic strip reading head.

The smart card reader 56 is also supported by the module housing portion 16 and has a body 70 defining its own slot 71 that is aligned with the card receiving opening 13 and the smart card slot 64, as shown in FIGS. 4-6 and 8. In this manner, the smart card slot 64 guides advancement of the smart card 101 into the slot 71 where it is held for reading by smart card circuitry 72 of the smart card reader 56. For example, the smart card reader 56 may make contact with conducting contact surfaces on the smart card 101. Or the smart card reader may be a RFID reader/encoder/decoder that pings the smart card with RF energy and reads and decodes the response, or encodes and sends information to the RFID tag, or just reads the response if the smart card has its own power source. Notably, the body 70 could also be considered part of the module housing portion 16 making slot 71 part of slot 64. Information read by the smart card circuitry 72 is communicated to the card reader circuit board 40 via a ribbon cable 73.

As is apparent from the previous statement about the body 70 defining the slot 64 and other similar statements above, the term "housing" as used herein can refer to any non-card reading portion that can define at least a portion of a slot or guide surface for information cards. Also, the slots described herein are not necessarily defined by a single continuous surface but could be formed between various partial surfaces as long as sufficient structure is provided to guide motion of the information cards.

Notably, in the illustrated embodiment the paths of the magnetic strip card 100 and the smart card 101 pass each other (as shown in FIG. 7), as do the paths of the slots 63, 64 at the card receiving opening 13 which facilitates a relatively compact configuration for the multiple card reading apparatus 14, as shown in FIGS. 4-6 and 8. The smart card slot 71 also extends parallel with respect to the display pad 36 to improve the compactness of the configuration. It should be noted, however, that variations are possible with other embodiments including the point at where the paths of the slots 63, 64 pass each other. For instance, the slots might cross at their midpoints within the module housing portion 16, or at some offset position instead of at its entrance.

Also, the number of slots and types of card readers could be varied, such as by adding a third slot that extends from the same card receiving opening 13, or that crosses the path of one or more of the slots 63, 64 and includes an optical card reader or scanner. Further, the angle and positioning of these slots could be changed from 30° to 60° or 90° or more degrees, or even less than 30° (e.g., 10°, 15° or 25°) depending upon the size and orientation of the card readers. In another example, two smart card slots 64 could be positioned adjacent each other and in the path of the magnetic strip card slot so as to allow for three total card reading devices.

During use, the handheld printer device 10 is gripped in one hand and the user determines which card is being held in the other hand. If the card is the magnetic strip card 100, the edge of the card closest to the magnetic strip 102 is inserted into the card receiving opening 13 and the magnetic strip card slot 63. The magnetic strip card 100 is swiped therethrough, guided by the card receiving opening 13 and the magnetic strip card slot 63, and by a portion of the smart card slot 64. As one edge of the magnetic strip card 100 hits the magnetic strip reading head 65 it pushes the head back against its bias (out of the magnetic strip card slot 63). The magnetic strip 102 of the card 100 then passes underneath the magnetic strip reading head 65 which reads the data from the magnetic strip.

Alternatively, if the card is the smart card 101, the smart card is inserted through the center of the card receiving opening 13 and into the smart card slot 64. The smart card slot 64 guides the smart card 101 into the slot 71 in the body 70 of the smart card reader 56. The smart card reader 56 contacts one or more contact surfaces on the smart card to communicate with its circuitry. Alternatively, the smart card may be pinged (if necessary) and the RF emission by the smart card 101 is read by the smart card reader 56 and converted into data. This data, or the data from the magnetic strip reading head 65, is then received and/or processed (such as by wireless transmission via a LAN for clearance at a clearinghouse computer) by the card reader circuit board 40. The card reader circuit board can then use this data to control the main circuit board 23, such as by generating data for printing of a receipt.

The above embodiments illustrate a module including both a magnetic strip reader and a smart card reader. It is understood that this is only one embodiment and that any combination of readers requiring different slots for receive the card or other media is contemplated. For example, the slot used for reading magnetic strips could be replaced with a barcode reader, while the slot for the smart card reader could be replaced by a reader for reading encoded indicia, such as fluorescent indicia, holograms, encoded graphics, etc.

Further, the above embodiments are discussed in terms of providing readers for reading information stored in the card or other media. It must be understood that devices having write capabilities may also be used, such as an RFID write/read device or encoder/decoder, magnetic strip write/read device, etc.

In the above embodiment, the two slots in the module extend in the same cross-machine direction and are overlapping. However, the slots could be closely adjacent each other or offset from each other in close proximity, without overlapping, so as to minimize the space required for the slots. For example, both slots could be in a roughly parallel, stacked arrangement, or could be in a side by side arrangement so that the slots have overlapping or adjacent edges.

The present invention has many advantages. The multiple card reading apparatus 14 provides a relatively compact configuration for reading multiple cards that can be coupled with a range of devices, such as handhelds cameras, printers, security devices, etc. For example, the overlapping configuration of the card slots 63, 64 allow the same portion of the housing 12 to be used to guide the different types of cards 100, 101. In addition, positioning of the card receiving opening 13 as the area of overlap of the card slots 63, 64 minimizes the aesthetic impact of the card slots and the surface area taken up by the card slots. Angling the card slots with respect to each other allows the differently shaped magnetic strip and smart card readers 55, 56 to be closely positioned adjacent to each other.

Many modifications and other embodiments of the inventions set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus configured for reading information stored in at least two different formats from one or more media, said apparatus comprising:
   a first communication device configured to communicate information in a first format;
   a second communication device configured to communicate information in a second format;
   a housing at least partially defining a first media slot configured to receive and guide a first media configured for communicating information in the first format while in a position accessible by said first device, and at least partially defining a second media slot configured to receive and guide a second media configured for communicating information in the second format while in a second position accessible by the second device, wherein the first and second media slots overlap proximate a common portion, extend at different angles from each other, and are configured such that the first media configured for communicating in the first format extends through the common portion when in the first position or, alternatively, the second media configured for communicating in the second format extends through the common portion when in the second position, and wherein the first media cannot be in the first position while the second media is in the second position, and the second media cannot be in the second position while the first media is in the first position.

2. A multiple media reading apparatus of claim 1, wherein said common portion is an entrance portion.

3. A multiple media reading apparatus of claim 2, wherein the first media slot and second media slot have generally linear shapes.

4. A multiple media reading apparatus of claim 3, wherein the first media slot extends through lateral edges of the housing so as to allow swiping of the first media past the first communication device.

5. A multiple media reading apparatus of claim 4, wherein the second media slot is contained within the lateral edges of the housing and is configured for insertion and temporary retention of the second media.

6. A multiple media reading apparatus of claim 5, wherein the first and second slots are positioned at an angle between 10° to 45° with respect to each other.

7. An apparatus configured for reading information stored in at least two different formats from one or more media, said apparatus comprising:
   a first communication device configured to communicate information in a first format;
   a second communication device configured to communicate information in a second format; and
   a housing at least partially defining a first media slot configured to receive and guide a first media configured for communicating information in the first format while in a position accessible by said first device, and at least partially defining a second media slot configured to receive and guide a second media configured for communicating information in the second format while in a position accessible by the second device,
   wherein the first and second media slots each have a common portion;
   wherein said common portion is an entrance portion;
   wherein the first media slot and second media slot have generally linear shapes and wherein the slots extend at different angles from each other;
   wherein the first media slot extends through lateral edges of the housing so as to allow swiping of the first media past the first communication device;
   wherein the second media slot is contained within the lateral edges of the housing and is configured for insertion and temporary retention of the second media; and
   wherein the first and second slots are positioned at a 30° angle with respect to each other.

8. A multiple media reading apparatus of claim 1, wherein the first communication device includes a magnetic strip reader.

9. A multiple media reading apparatus of claim 8, wherein the second communication device includes a smart card reader.

10. A multiple media reading apparatus of claim 1, wherein the housing is a housing for a printer.

11. A multiple media reading apparatus of claim 1, wherein the first communication device is relatively smaller, and positioned closer to a surface of the housing, than the second communication device.

12. A multiple media reading apparatus of claim 1, further comprising a wireless communications device connected in communication with the first and second communication devices and configured to receive data therefrom and communicate the data wirelessly to a network.

13. A multiple media reading apparatus of claim 12, further comprising a printer device connected to the wireless communication device and the first and second communication devices, the printer device being configured for receiving data therefrom for printing.

14. A multiple card reading apparatus of claim 1, wherein the multiple media reading apparatus is part of a handheld device.

15. A method of reading information stored in at least two different formats from one or more media, said method of reading including:
   receiving and guiding a first media in a first media slot of a housing into a first position accessible by a first communication device configured to communicate information in a first format;
   removing the first media from the first position; and
   receiving and guiding a second media in a second media slot of the housing through a portion of the first media slot and into a second position accessible by a second communication device configured to communicate information in a second format,
   wherein receiving and guiding the first media through the first media slot includes guiding the first media at a different angle than receiving and retaining the second media in the second media slot, and wherein the first media cannot be in the first position while the second media is in the second position, and the second media cannot be in the second position while the first media is in the first position.

16. A method of claim 15, wherein receiving and guiding the first media includes swiping of the first media through the first media slot which extends through lateral edges of the housing.

17. A method of claim 16, wherein receiving and guiding the second media includes receiving and temporarily retaining the second media in the second media slot of the housing.

18. A method of claim 15, further comprising reading data from the first media with the first communication device and reading data from the second media with the second communication device.

19. A method of claim 18, further comprising wirelessly transmitting data read from the first and second media to a clearinghouse.

20. A multiple media reading apparatus for reading at least two different types of information contained on one or more media, said multiple media reading apparatus comprising:
   a first card reading device configured to read information from a first type of card;
   a second card reading device configured to read information from a second type of card; and
   a housing at least partially defining a first card slot configured to receive and guide the first type of card into a first position at which the first type of card is readable by the first card reading device, and at least partially defining a second card slot configured to receive and guide the second type of card into a second position at which the second type of card is readable by the second card reading device, wherein the first and second card slots overlap proximate a common portion, extend at different angles from each other, and are configured such that the first type of card extends through the common portion when in the first position or, alternatively, the second type of card extends through the common portion when in the second position, and wherein the first type of card cannot be in the first position while the second type of card is in the second position, and the second type of card cannot be in the second position while the first type of card is in the first position.

21. A method of reading at least two different types of information containing cards, including a first type of card and a second type of card, said method of reading different types of cards including:
   receiving and guiding a first type of card, in a first card slot of a housing, into a first position configured to allow the first type of card to be read by a first card reading device;
   removing the first type of card from the first position; and
   receiving and guiding a second type of card, in a second card slot of the housing, through a portion of the first card slot and into a second position configured to allow the second type of card to be read by the second card reading device, wherein the first position configured to allow the first type of card to be read and the second position configured to allow the second type of card to be read are angled with respect to each other, and wherein the first type of card cannot be in the first position while the second type of card is in the second position, and the second type of card cannot be in the second position while the first type of card is in the first position.

* * * * *